US008465287B2

(12) United States Patent
Drazan (10) Patent No.: US 8,465,287 B2
(45) Date of Patent: Jun. 18, 2013

(54) ALTERNATIVE ENERGY POWERED ELECTRONIC READER HAVING PRELOADED EDUCATIONAL DATA (76) Inventor: Jeffrey M Drazan, Woodside, CA (US)

(*) Notice: Subject to any disclaimer, the term of this patent is extended or adjusted under 35 U.S.C. 154(b) by 507 days.

(21) Appl. No.: 12/764,120

(22) Filed: Apr. 21, 2010

(65) Prior Publication Data
US 2011/0262886 A1 Oct. 27, 2011

(51) Int. Cl.
G09B 5/00 (2006.01)
(52) U.S. Cl.
USPC .......................................... 434/169
(58) Field of Classification Search
USPC ................ 434/156, 169, 178; 136/206, 243
See application file for complete search history.

(56) References Cited

U.S. PATENT DOCUMENTS

| 7,239,237 | B2 * | 7/2007 | Hess | 340/539.1 |
|---|---|---|---|---|
| 7,612,997 | B1 * | 11/2009 | Diebel et al. | 361/679.56 |
| 2006/0042685 | A1 * | 3/2006 | Wang | 136/256 |
| 2006/0290844 | A1 * | 12/2006 | Epstein et al. | 349/113 |
| 2007/0222375 | A1 * | 9/2007 | Liu et al. | 313/506 |
| 2007/0269716 | A1 * | 11/2007 | Wadley et al. | 429/208 |
| 2008/0092941 | A1 * | 4/2008 | Kuo | 136/248 |
| 2008/0141182 | A1 * | 6/2008 | Barsness et al. | 715/864 |
| 2009/0020149 | A1 * | 1/2009 | Woods et al. | 136/244 |
| 2009/0123813 | A1 * | 5/2009 | Chiang et al. | 429/50 |
| 2009/0281229 | A1 * | 11/2009 | Topoulos | 524/504 |
| 2010/0141689 | A1 * | 6/2010 | Johnson | 345/690 |
| 2010/0281208 | A1 * | 11/2010 | Yang | 711/103 |

* cited by examiner

Primary Examiner — Bruk Gebremichael
(74) Attorney, Agent, or Firm — Raj Abhyanker, P.C.

(57) ABSTRACT

A method, system and an apparatus of alternative energy powered electronic reader having preloaded educational data is disclosed. In one embodiment, a method includes converting a solar energy, through a photovoltaic cell, into an electrical current to utilize the solar energy of the sun. In addition, the method includes storing the electrical current in a battery to provide a power source to an electronic reader. The method also includes powering the electronic reader through the battery to provide an electronic content to a user. The method further includes storing the electronic content in a solid state drive in the electronic reader. The electronic content may be an educational lesson.

13 Claims, 8 Drawing Sheets

ALTERNATIVE ENERGY POWERED ELECTRONIC READER HAVING PRELOADED EDUCATIONAL DATA

FIELD OF TECHNOLOGY

This disclosure relates generally to the technical field of consumer devices and, in one embodiment, to a method, system and an apparatus of alternative energy powered electronic reader having preloaded educational data.

BACKGROUND

An electronic reader may be a hardware device designed to provide content (e.g. text, video, or audio) to a user. The content provided to the user by the electronic reader may be in the form of an electronic book. An electronic book may be a digital version of a printed book accessible by a hardware device, for example, an electronic reader.

The hardware and/or the electronic content associated with electronic readers may be too costly as an alternative to printed books for residents of developing countries. In addition, they may fragile and not designed to handle environment conditions, for example, humidity and/or dust. Alternatively, electronic readers may have a negative environmental impact, for example, utilizing toxic compounds and/or lacking renewable energy inputs.

SUMMARY

A method, system and an apparatus of alternative energy powered electronic reader having preloaded educational data is disclosed. In one aspect, a method includes converting a solar energy, through a photovoltaic cell, into an electrical current to utilize the solar energy of the sun. In addition, the method includes storing the electrical current in a battery to provide a power source to an electronic reader. The method also includes powering the electronic reader through the battery to provide an electronic content to a user. The method further includes storing the electronic content (e.g., electronic book, educational lesson) in a solid state drive in the electronic reader. In addition, the method includes illuminating a room, through a light source coupled to the electronic reader, to provide a light to the user.

The photovoltaic cell described herein may be made into a thin film. The thin film of the photovoltaic cell may be made of a silicon. The silicon may be in any of an amorphous silicon form, protocrystalline silicon form, nanocrystalline silicon form, and black silicon form. An efficiency of the conversion of the solar energy to the electrical current may be greater than fourteen percent. The method may include storing an educational lesson on the electronic reader. A subject of the educational lesson may be any of mathematics, biology, chemistry, physics, economics, literature, history, etc. A medium of the educational lesson may be through any of a text, an image, an audio, and/or a video. The method may also include reducing a writable storage capacity of the solid state drive of the electronic reader to reduce a power consumption and a heat generation of the solid state drive.

The method may further include using a bioplastic to encase the electronic reader. The bioplastic may be a plastic derived from a biomass source comprising one of a vegetable oil, a corn starch, a pea starch, and/or a microbiota. The bioplastic may have a characteristic to absorb humidity to reduce a damage to an electrical component of the electronic reader. Alternatively, the method may include a plastic material to encase the electronic reader. The plastic material being used may be easily available. In addition, the plastic material being chosen for the encasing may have strong tensile strength. In addition, the plastic material described herein may be waterproof and dust resistant to protect the electronic reader from moisture and dust.

The thin film of the photovoltaic cell may also include a photosensitive dye to generate a photoelectron to create the electrical current and to reduce a cost of the conversion of the solar energy to the electrical current. The method may include displaying one of a text, an image, and a video of the electronic content through a liquid crystal display. The liquid crystal display may be any of a color display, a passive matrix display, an active matrix display, and a bitstable display. The usage of bitstable display may reduce a power consumption of a display. The method may also include reducing a cost of a display with an organic light emitting diode. The organic light emitting diode may be a light emitting diode comprising an emissive electroluminescent layer comprising a film of an organic compound. The organic light emitting diode may be printed onto a substrate with one of an inkjet printer and a screen printing device. The battery used herein may be a lithium iron phosphate battery. The lithium iron phosphate battery may be a rechargeable battery comprising a lithium iron phosphate. The lithium iron phosphate may be a cathode. In addition, a nickel metal hydride battery may also be used. The nickel metal hydride battery may be a rechargeable battery that includes the hydrogen absorbing alloy, where the hydrogen absorbing alloy may be an anode.

In another aspect, an electronic reader apparatus includes a photovoltaic cell to convert a solar energy into an electrical current to utilize the solar energy of the sun. In addition, the electronic reader apparatus includes a battery to store the electrical current generated by the photovoltaic cell. The electronic reader apparatus also includes an electronic content to provide one of a text, an image, an audio, and/or a video to a user of the electronic reader. The electronic reader apparatus further includes a solid state drive to store the electronic content of the electronic reader. In addition, the electronic reader apparatus includes a bioplastic case to encase the electronic reader. The electronic reader apparatus also includes a display to display one of a text, an image, and a video of the electronic content. The electronic reader apparatus may include a communication port to enable the electronic reader to transfer the electronic content to an electronic device. The communication port may be any of a wireless port and a universal serial bus port.

In yet another aspect, an electronic educational system includes a photovoltaic cell to convert a solar energy into an electrical current to utilize the solar energy of the sun. In addition, the electronic educational system includes a battery to store the electronic current generated by the photovoltaic cell. The electronic educational system also includes an electronic content to provide one of a text, an image, an audio, and a video to a user of an electronic reader. The electronic educational system further includes a solid state drive to store the electronic content of the electronic reader. In addition, the electronic educational system includes a display to display one of a text, an image, and a video of the electronic content. The electronic educational system also includes a hub device to transfer the electronic content of the hub device to the electronic reader. The hub device may be preconfigured to interact with the electronic reader. Also, the electronic reader may be preconfigured to interact with the hub device.

The hub device may distribute the electronic content comprising of an educational lesson and a feedback of the educational lesson to the electronic reader. The hub device may be accessible to a teacher. The electronic reader may distribute the electronic content that includes a homework or an assignment to the hub device. The electronic reader may be accessible to a student.

Other aspects will be apparent from the following description and the appended claims.

BRIEF DESCRIPTION OF THE VIEWS OF DRAWINGS

Example embodiments are illustrated by way of example and not limitation in the figures of accompanying drawings, in which like references indicate similar elements and in which.

Other features of the present embodiments will be apparent from accompanying Drawings and from the Detailed Description that follows.

DETAILED DESCRIPTION

A method, system and an apparatus of alternative energy powered electronic reader having preloaded educational data is disclosed. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1A:
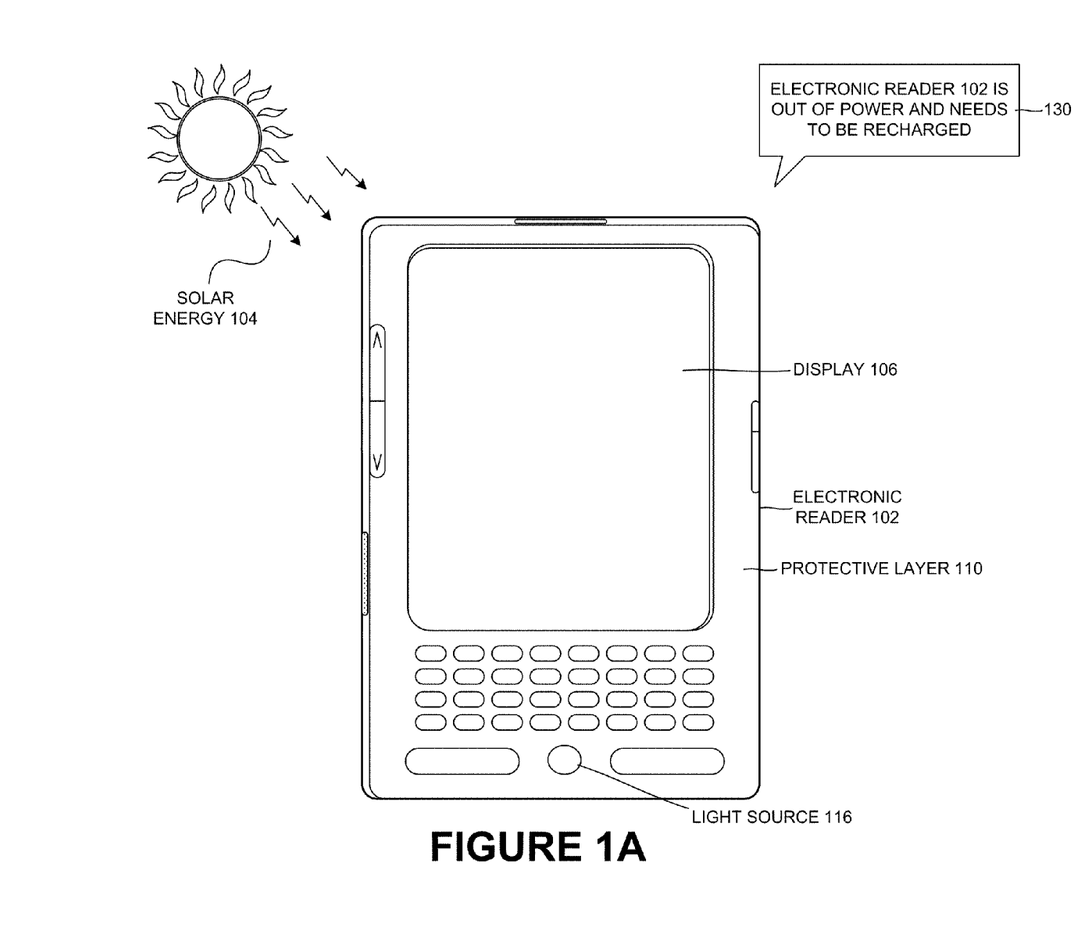
FIG. 1A-C is a diagrammatic process flow of illustrating usage of an electronic reader, according to an example embodiment.
Figure 1B:
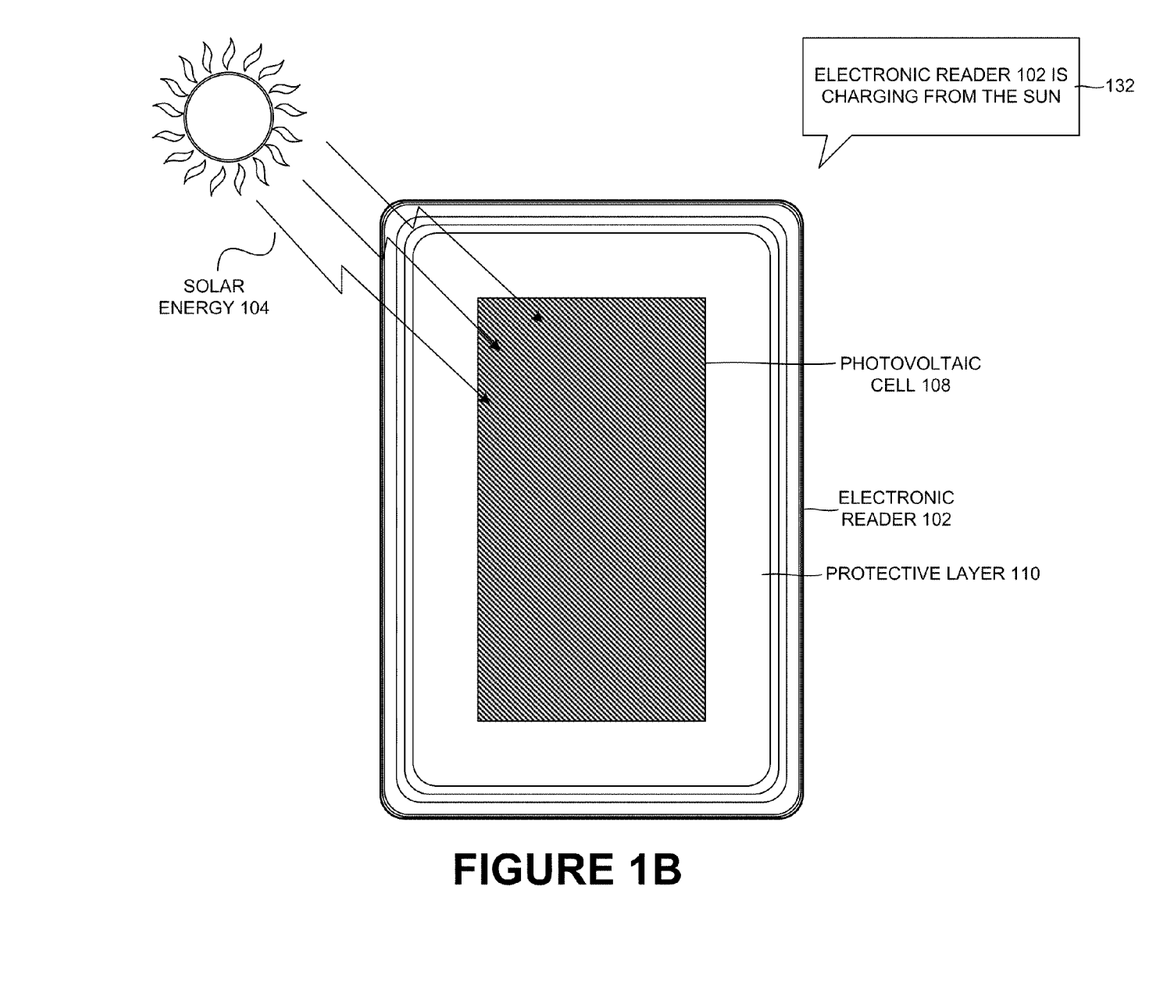
Figure 1C:
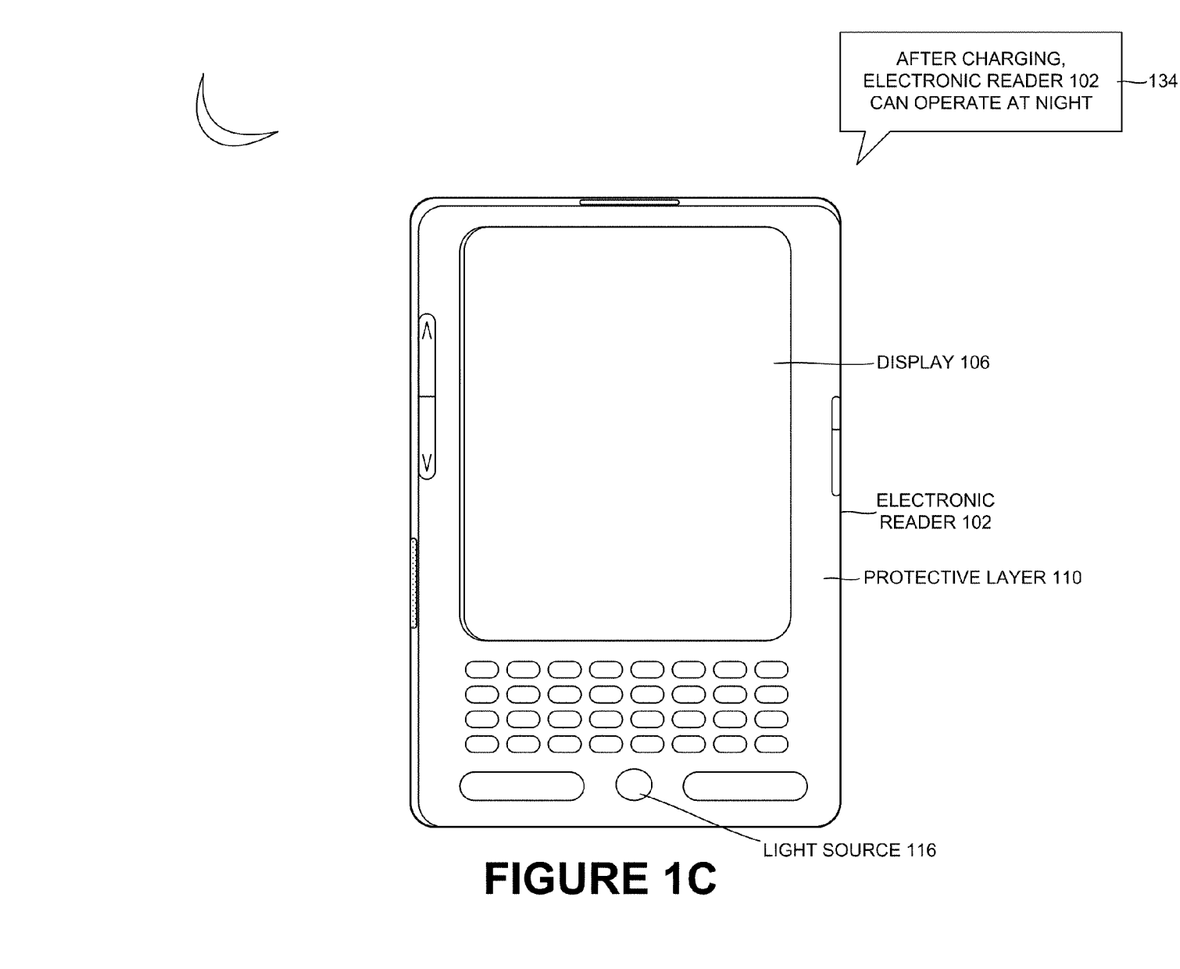
Figure 4:
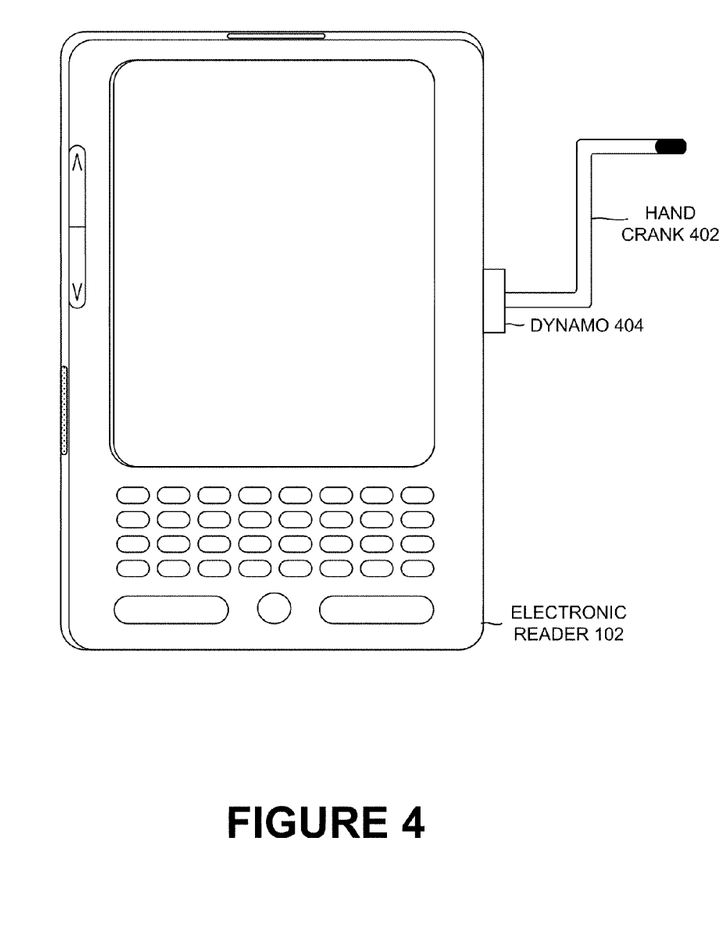
FIG. 4 is a schematic view illustrating powering the electronic reader through a mechanical means, according to an example embodiment.

FIG. 1A-C is a diagrammatic process flow illustrating usage of an electronic reader, according to an example embodiment. In one or more embodiments, the electronic reader 102 may be an electronic device that has inter alia, a memory unit, a display 106, and a processor for displaying digital information. The electronic reader 102 described herein may be a device that is configured to display digital contents such as text, video, flash, etc. In addition, the electronic reader 102 may also be configured to play audio data. The electronic reader 102 described herein may be powered by an energy source such as a battery. The battery may be a rechargeable battery that can be recharged through energy generated through a renewable energy source such as solar energy. As illustrated in FIG. 1A-B, the battery of the electronic reader 102 is charged 132 (e.g., FIG. 1B) using the solar energy 104. FIG. 1A illustrates the battery being recharged 130 after the charge in the electronic reader 102 is used up. The solar energy 104 is converted in to an electrical current by a photovoltaic cell 108 as illustrated in FIG. 1B. The rate of conversion of the solar energy 104 to an electric current may be greater than fourteen percent. The electrical current that is generated, may be stored in the battery. The electrical current stored in the battery may be used to power various components of the electronic reader 102 to enable the electronic reader 102 to display the electronic content present in the memory unit. In one or more embodiments, the battery may also be powered through other sources (e.g., mechanical means as illustrated in FIG. 4).

The electronic content such as text, video, etc. may be viewed on the display 106. In one or more embodiments, with above threshold charge in the battery, the electronic reader 102 may be used at any point of time. The electronic reader 102 can be also be used at night 134 with a backlight in the display. Housing of the electronic reader 102 including the input device, the display 106, and the photovoltaic cell 108 may be covered by a thin protective layer 110 to protect the electronic reader 102 from damages caused while in use (e.g., scratches). In one or more embodiments, the housing of the electronic reader 102 may be made of eco-friendly material such as bioplastic. In one or more embodiments, the bioplastic material may be a plastic material derived from a biomass source including, but not limited to a vegetable oil, a corn starch, a pea starch, and microbiota. Petroleum based plastic may be reduced to make the housing of the electronic reader 102 eco-friendly. In addition, damage to the electronic reader 102 due to environmental conditions such as humidity may be reduced by using bioplastic material as the bioplastic material may have a characteristic of absorbing humidity. In alternative embodiment, the housing of the electronic reader 102 may also be made of plastic to reduce cost. The housing of the electronic reader 102, however, may be strong due to materials with good tensile strength.

Furthermore, the electronic reader 102 may be eco-friendly by using batteries such as lithium ion, nickel metal hydride battery or battery that includes hydrogen absorbing alloy to power the electronic reader 102 as they may be less toxic compared to nickel cadmium batteries. The electronic reader 102 may also be made less expensive using easily available materials for manufacturing. Furthermore, since the electronic readers 102 may be used on long term basis, highly durable components and less fragile materials or components may be used. For example, a solid state drive may be used in place of hard drive for long durability, as the hard drive may be prone to mechanical failure easily. In addition, a light source 116 may be implemented in the electronic reader 102. A highly durable light source 116 may be used to ensure that the light source 116 does not burn out in a short time span.

Figure 2:
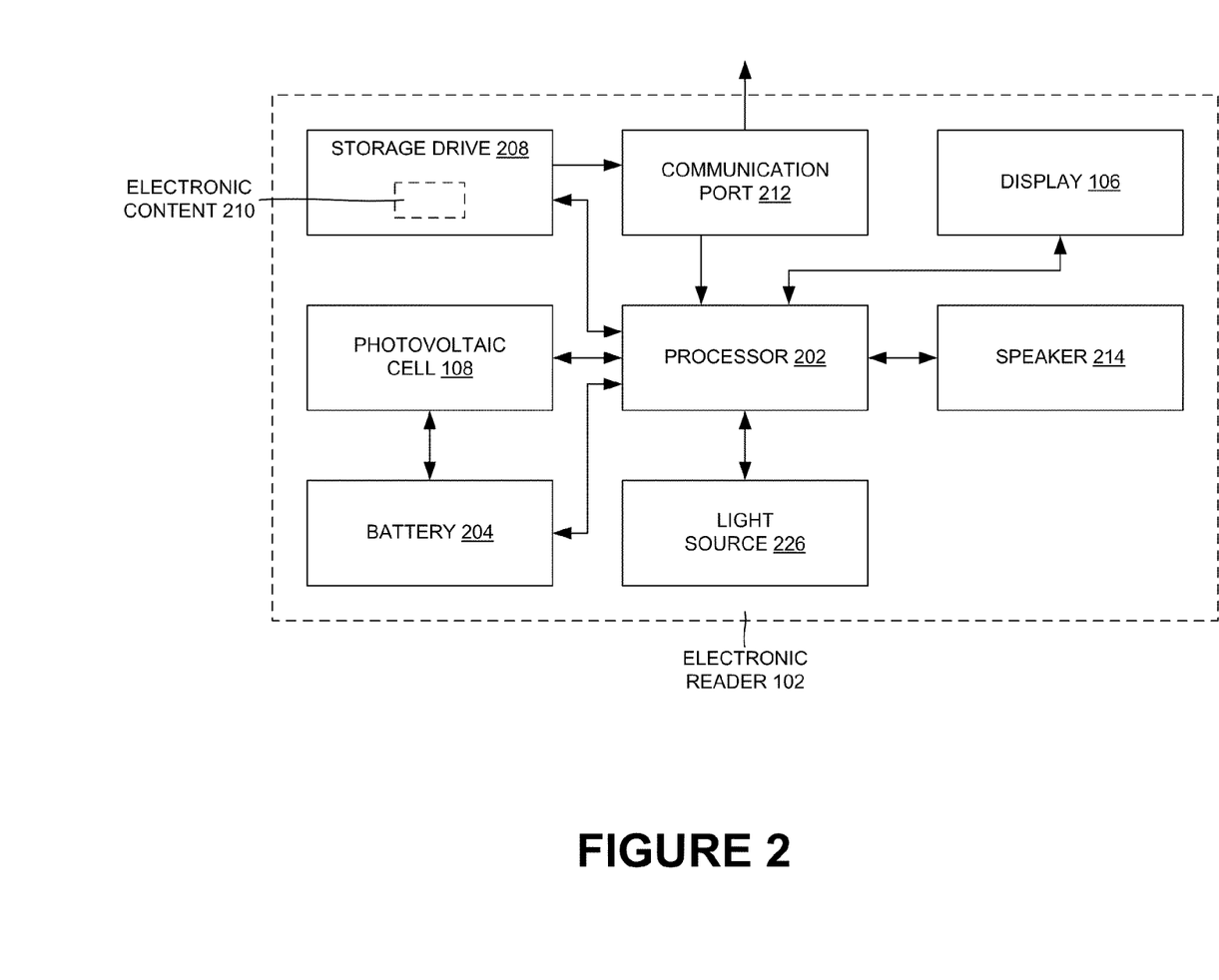
FIG. 2 is a schematic view of the electronic reader, according to one or more embodiments.
Figure 3:
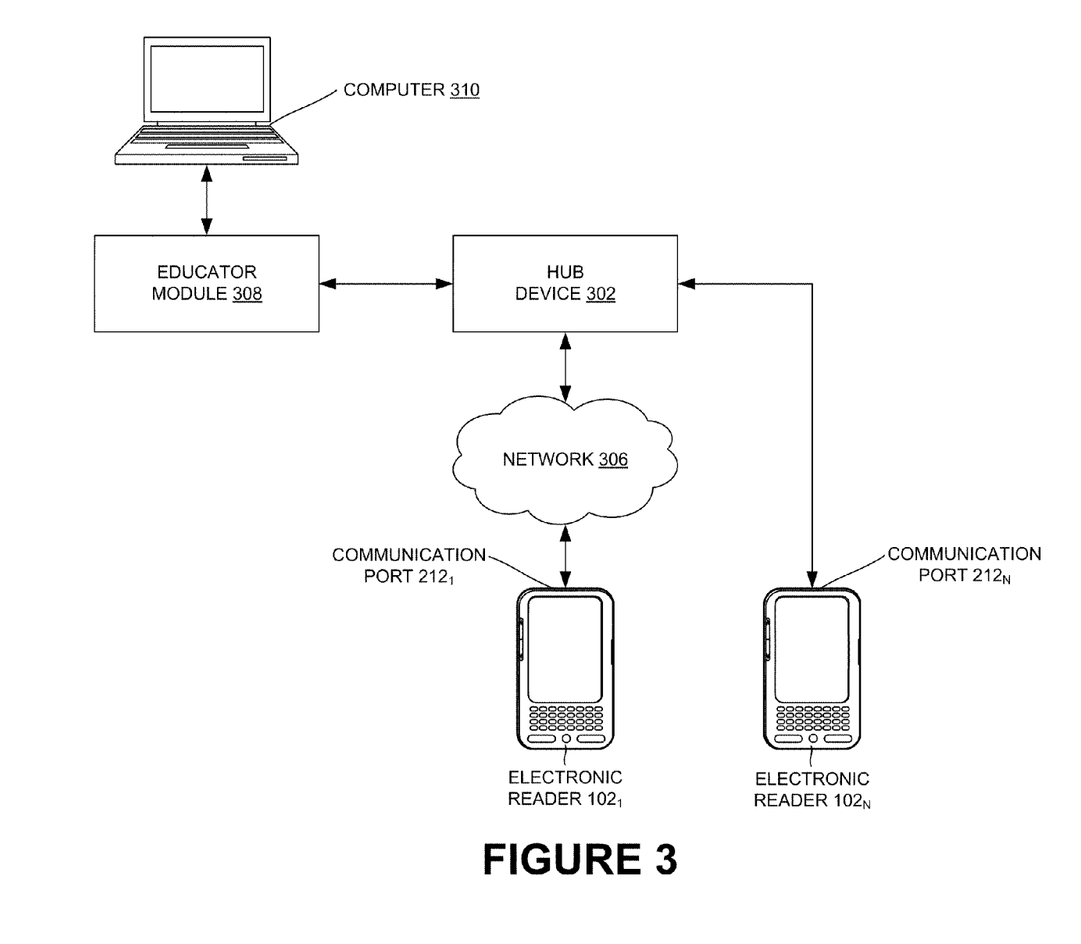
FIG. 3 is a system view illustrating the electronic reader coupled to a network for data communication, according to one or more embodiments.

FIG. 2 is a schematic view of the electronic reader 102, according to one or more embodiments. The electronic reader 102 may be controlled through a processor 202. Functions and process may be coordinated by the processor 202 provided thereof. The functions and the process of the electronic reader 102 may be controlled using a firmware resident in a memory unit of the processor 202. Furthermore, the educational content 210 (e.g., electronic content) to be displayed or played using the electronic reader 102 may be stored in a storage drive 208. In addition, other programs such as support programs for the educational content 210 may be stored in a storage drive 208 provided thereof. In one or more embodiments, the storage drive 208 discussed herein may consist only of a read only memory comprised of solid-state drive that uses solid-state memory for storing data. Furthermore, the educational content 210 may be downloaded externally via a communication port 212. In one or more embodiments, the communication port 212 may be used for communication with other devices such as a computer. In addition, the communication port 212 may also be used to connect with network. However, the electronic reader 102 may be pre-configured to communicate with a pre-determined module through a hub device through the network (e.g., as illustrated in FIG.

3). Updates to the firmware may also be obtained through the communication port 212 by coupling to the network. The communication process through the communication port 212 with other devices and/or the network may be enabled through suitable protocols and controlling circuits provided thereof.

Furthermore, the electronic reader 102 may be communicatively coupled to the network wirelessly using a wireless adapter coupled to the communication port 212. In one or more embodiments, the educational content 210 described herein may be educational resources such as courses that include educational lessons in a form that includes, but not limited to a text, an audio, a video, and an image. The educational content 210 in the storage drive 208 may be played or displayed using appropriate software. For example, an Electronics 101 course in a Portable Document Format file may be viewed using Adobe® Reader software. Subjects such as mathematics, biology, chemistry, physics, economics, literature, history, etc. may be provided as the electronic content. In one or more embodiments, the educational content 210 that includes educational content may be provided through the electronic reader 102 using an interactive methodology. Input devices such as keyboard may be provided in the electronic reader 102 to enable the user to input data, to interact with the electronic content, or for clarification requests, providing responses, submitting assignments, etc. In one or more embodiments, a writable storage capacity of the solid state drive may be reduced to reduce a power consumption of the electronic reader 102 and a heat generation of the solid state drive. In addition, a write performance may be made slower than a read performance of the solid state drive. The user specific data such as input, profile information may be stored in the storage drive 208. The user specific data may be communicated through the communication port 212 for information exchange to a pre-determined module through a hub device (e.g., as illustrated in FIG. 3).

Furthermore, the charge level in the battery 204 may be monitored by the processor 202. The charge level in the battery 204 may be indicated in the display 106. Also, an alert tone may be played through a speaker 214 when the charge level in the battery 204 is low. Also, the speaker 214 may be used to play audio data of the course. In one or more embodiments, the battery 204 may be a rechargeable battery. In one or more embodiments, the battery 204 may be a lithium iron phosphate battery, where the lithium iron phosphate may be a cathode. Also, in one or more embodiments, the battery 204 may be a nickel metal hydride battery. The nickel metal hydride battery may be a rechargeable battery that includes the hydrogen absorbing alloy. In one or more embodiments, the hydrogen absorbing alloy may be an anode in case of use of nickel metal hydride battery. The battery 204 may be charged by the electric current generated by the photovoltaic cell 108. In alternate embodiments, another equivalent battery may be also be used as well. Furthermore, any excessive current or overload conditions may be monitored by appropriate safety circuits.

In one or more embodiments, the photovoltaic cell 108 described herein may include a thin film made of silicon. The thin film may be made of photosensitive dye to generate photoelectrons that can be collected as electric current. In addition, the silicon component in the photovoltaic cell may be any of, but not limited to amorphous silicon, protocrystalline silicon, nanocrystalline silicon, and black silicon. Furthermore, content composition of the photovoltaic cell 108, layout of the photovoltaic cell 108 may be designed based on the current requirements of the electronic reader 102.

In one or more embodiments, a user interface (e.g., FIG. 3) may be provided via the display 106 to enable a user to manage the content. In addition, additional tools such as toolbar, scrollbar, etc. may be provided to enable the user to seamlessly control the electronic content in the electronic reader 102.

In one or more embodiments, the display 106 may be made from any of, but not limited to a Liquid Crystal Display (LCD), and Organic Light Emitting Diode (OLED). In case of LCD, the display may be any of, but not limited to a color display, a passive matrix display, an active matrix display, and a bitstable display. The LCD may be a digital display that uses liquid crystal cells that change reflectivity in an applied electric field. The consumption of power may be reduced using bitstable LCD display among the choice of aforementioned LCD's. In terms of cost, OLED may be cost effective. The OLED may be a light emitting diode that may include an emissive electroluminescent layer comprising a film of an organic compound. In one or more embodiments, the OLED's may be printed on to a substrate using an inkjet printer, a screen printing device or any other appropriate device.

In addition, a light source 226 may also be included in the electronic reader 102 to illuminate surroundings. Light emitting diodes, small bulbs, etc. may be used as the light source 226. The light source 226 may also be powered using the battery 204. In one or more embodiments, the light source 226 may include a light emitting diode to generate a white light. In one or more embodiments, the white light may be generated by mixing light emitted from a red light emitting diode, a green light emitting diode, and a blue light emitting diode or converting a blue light emitting diode and/or an ultraviolet light emitting diode to the white light through a phosphor material. Other sources may also be used as generating light. Any other appropriate color light may also be emitted from the light source 226.

FIG. 3 is a system view illustrating the electronic reader being connected to the network for information exchange, according to one or more embodiments. As described in FIG. 2, the educational content 210 for the electronic reader $102_{1-N}$ may be obtained from a hub device 302. The hub device 302 may be communicatively coupled to an educator module 308. In one or more embodiments, the educator module 308 may be a data processing system, such as a server or a computer. The educational content 210 for the electronic reader(s) $102_{1-N}$ may be input into the educator module 308 by content providers such as educational institutions, universities, government bodies, nonprofit organizations, etc. who are authorized by government to provide the educational content 210. In addition, the educator module 308 may be accessed by content providers and teachers in charge for scheduling the communication of the educational content 210. In one or more embodiments, the educator module 308 may be accessed through data processing system such as a computer 310. In one or more embodiments, the educator module 308 may be accessed by respective persons with administrative privileges.

The educational content 210 including the educational lessons, feedback to the educational lessons, assignments, project works, etc. may be distributed to the electronic readers $102_{1-N}$ via the hub device 302 periodically. In one or more embodiments, the medium or language of in which the education may be imparted may be in English or any other suitable regional language.

In one or more embodiments, a curriculum of a student may be preloaded into the educator module 308 to distribute the educational content 210 at appropriate times. In one or more embodiments, the curriculum may include the educational lesson of a kindergarten study material through a twelfth grade study material. In one or more embodiments, the kindergarten study material through the twelfth grade study material may be developed by a nonprofit organization approved by a government organization to provide the curriculum to educate the student. In one or more embodiments, the curriculum as described herein may conform to an international standard of an education.

In one or more embodiments, the hub device 302 may be preconfigured to interact with the electronic reader $102_{1-N}$. Also, the electronic reader 102 may be preconfigured to interact with the hub device 302. In one or more embodiments, the electronic reader $102_{1-N}$ may be configured to communicate directly with the hub device 302 when connected to the network 306. The electronic reader $102_{1-N}$ may be communicatively coupled to the hub device 302 directly or through the network 306. In one or more embodiments, the electronic reader $102_{1-N}$ may be communicatively coupled to the network 306, the hub device 302 or the any other device using the communication port 312 provided thereof. In one or more embodiments, the communication through the communication port 312 may be a wired communication (e.g., Universal Serial Bus (USB)), wireless communication, or both.

Furthermore, input data such as profile data, user specific information, assignments, quizzes, etc. may be communicated to the hub device 302 when the electronic reader 102 is communicatively coupled to the network 306, the hub device 302, or any other appropriate means that enables communication with the hub device 302.

FIG. 4 is a schematic view illustrating powering the electronic reader 102 through a mechanical device, according to an example embodiment. In one or more embodiments, at environmental conditions such as non-availability of sunlight and/or at or at conditions such as non-availability of the energy in the battery 204, the electronic reader 102 may be powered through energy generated from a mechanical device such as a dynamo 404. In alternative embodiments, the electronic reader 102 may also powered through other mechanisms as well, not limited to dynamo mechanism. A dynamo 404 may be exclusively designed to couple with the electronic reader 102 to power the electronic reader 102 in a port provided thereof. Alternatively, a cable may be used that may be interfaced with the ordinary dynamo and the electronic reader 102 to transfer the power generated from the dynamo to the electronic reader 102. The cable described herein may also be used with other similar devices to transfer power to the electronic reader 102.

In an example embodiment, FIG. 4 illustrates an electronic reader 102 powered by the dynamo 404. The dynamo 404 may be used using the hand crank 402 provided thereof. The dynamo 404 with the hand crank 402 illustrated herein may be an exclusive powering component designed for the electronic reader. However, the electronic reader 102 may also be powered through an external dynamo. The dynamo 404 provided herein may be used to power the electronic reader 102 so that the user can access the educational content is situations where there is a low availability of sunlight and/or battery charge. In an alternative embodiment, the mechanical energy to power the electronic reader may be provided by wind.

Figure 5:
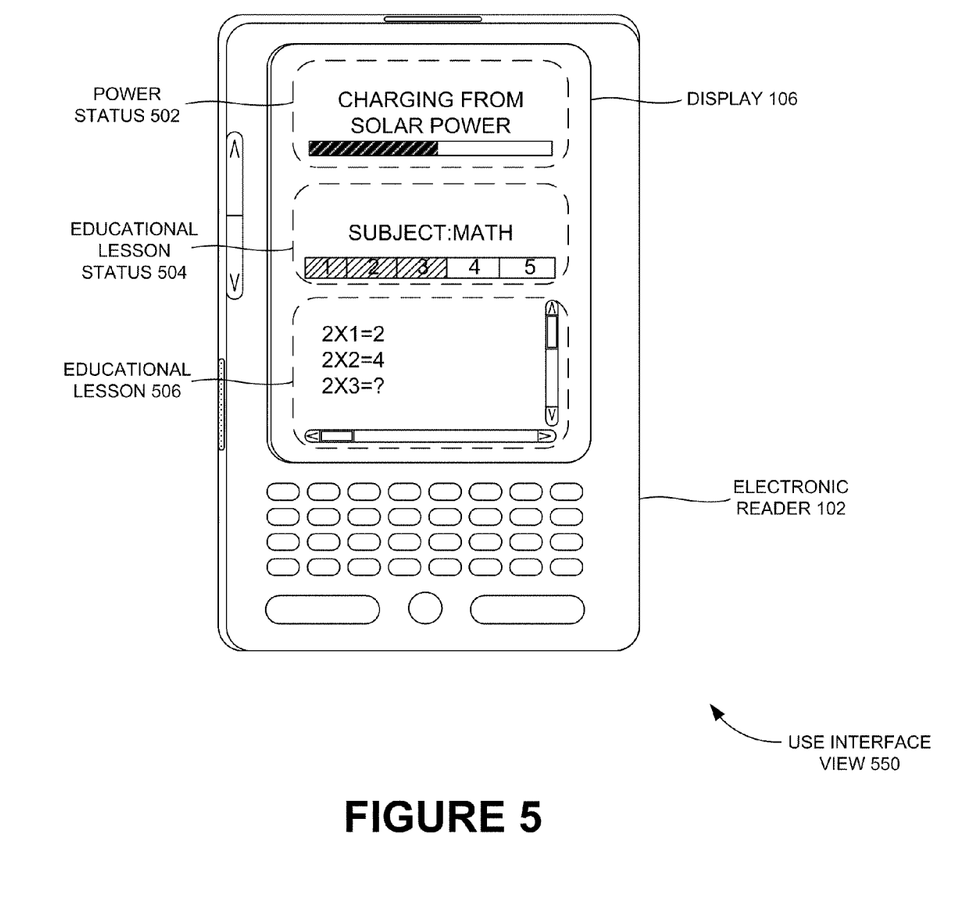
FIG. 5 is a user interface view illustrating an educational lesson being provided to a user, according to an example embodiment.

FIG. 5 is a user interface view illustrating an educational lesson 506 being provided to the user, according to an example embodiment. The educational content 210 may be provided in a graphical and/or textual medium, or any medium to assist in the education of students. Such lessons may be imparted to users (e.g., students) of various ages. In one or more embodiments, the educational content 210 may be interactive based.

The example embodiment illustrates the educational lesson 506 being imparted. In addition, a power status 502 (e.g., charging through solar energy) may be displayed optionally. Also, the status of the education lesson 504 may be displayed in the display 106 to keep the user updated about the progress of the educational lesson 506. The user interface view 550 illustrated in FIG. 5 illustrates a mathematics lesson being imparted in an interactive session.

Figure 6:
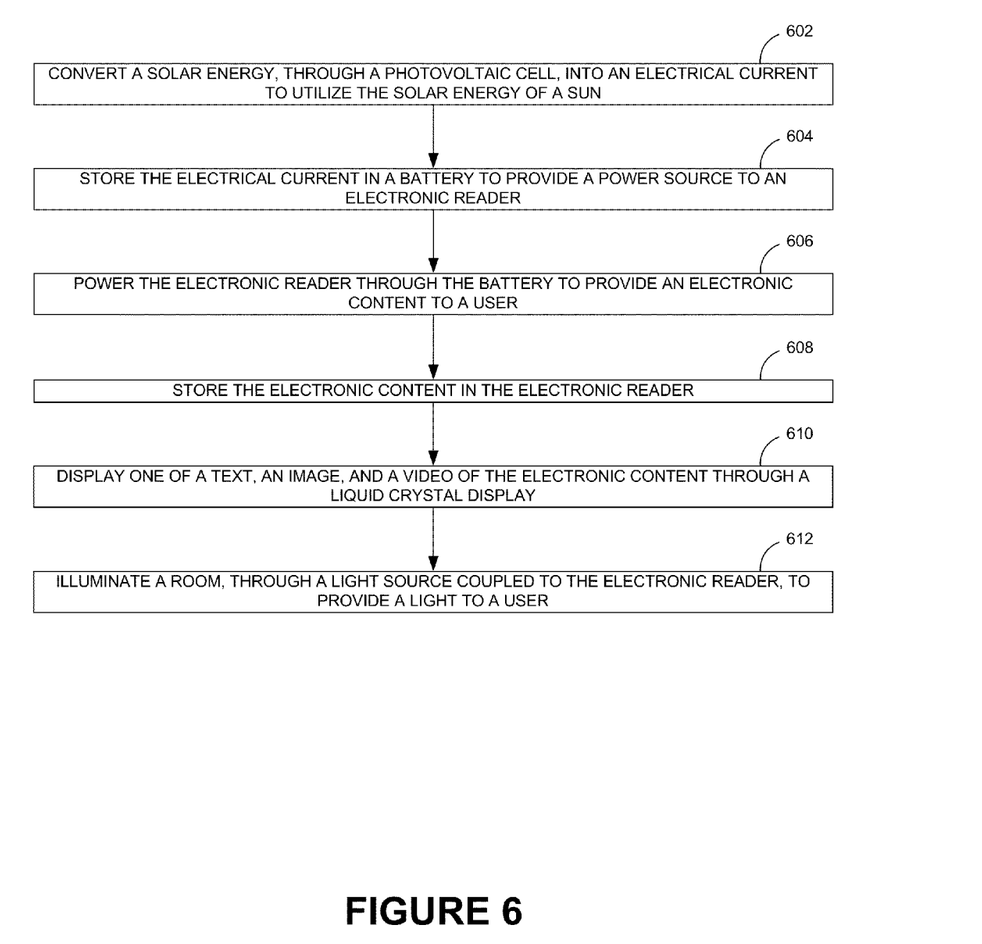
FIG. 6 is process flow illustrating a working of the electronic reader, according to one or more embodiments.

FIG. 6 is process flow illustrating a working of the electronic reader 102, according to one or more embodiments. In operation 602, a solar energy may be converted into an electrical current. In one or more embodiments, the solar energy may be converted into the electrical energy through the photovoltaic cell 108. In one or more embodiments, the generated electrical current may be used to power the electronic reader 102. In one or more embodiments, other alternative means such as dynamo (e.g., as illustrated in FIG. 4) may be used to power the electronic reader 102. In operation 604, the generated electrical current may be stored in the battery 204. In one or more embodiments, the battery 204 may be any of, but not limited to a lithium iron phosphate battery and nickel metal hydride battery. In one or more embodiments, an eco-friendly battery may be selected. In operation 606, the electronic reader 102 may be powered through the battery 204 to provide the educational content 210 to the user. In one or more embodiments, the light source 226 in the electronic device may also be powered through the battery 204. In one or more embodiments, the educational content 210 described herein may be educational lessons for the users (e.g., students). In operation 608, the educational content 210 may be stored in the electronic reader 102. In one or more embodiments, the educational content 210 may be stored in the storage drive 208 of the electronic reader 102. In one or more embodiments, the storage drive 208 may be a solid state drive. In one or more embodiments, the storage drive may be a read only memory, flash drive, etc. In one or more embodiments, the educational content 210 may be received from the educator module 308 through the hub device 302. In operation 610, a text, image, video, or anything associated with the educational content 210 may be displayed on the display 106.

Furthermore, in one or more embodiments, a limited area in proximity to the electronic reader 102 may be illuminated through the light source 226 to provide a light for visibility to the user. In one or more embodiments, the light source 226 may be powered by the battery 204.

Since the electronic reader 102 may be used for educational purposes and for developing countries, the electronic reader 102 may be made cost effective and eco-friendly. For example, the housing of the electronic may be made of eco-friendly material such as bioplastic. Though there may be tradeoff between cost and eco-friendly materials used, the eco-friendly material may be compensated by using highly durable, recyclable materials. In addition, the electronic reader 102 may be powered using solar energy, and other renewable energy means. Low power display, circuits, etc may also be used in manufacturing the electronic reader 102 to make the electronic reader 102 a low power device and/or to optimize the power requirements of the electronic reader 102.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed:

1. A method for providing electronic content via an electronic reader, wherein the electronic reader comprises alternative energy to power the electronic reader, the method comprising:
   converting solar energy, through a photovoltaic cell of the electronic reader, into electrical current to utilize the solar energy of the sun, wherein the photovoltaic cell is made into a thin film in order to obtain an efficiency of greater than fourteen percent in the conversion of the solar energy into electrical current, wherein the thin film of the photovoltaic cell comprises a silicon selected from one of an amorphous silicon, protocrystalline silicon, nanocrystalline silicon, and black silicon, and wherein the thin film of the photovoltaic cell comprises a photosensitive dye to generate a photoelectron to create the electrical current in order to reduce cost of the conversion of the solar energy into electrical current;
   generating electrical energy or current via a mechanical device, wherein the mechanical device comprises a dynamo with a hand crank electromechanically coupled to the electronic reader in order to convert mechanical energy into electrical energy;
   storing the electrical current into a battery to provide a power source to the electronic reader, wherein the electronic reader is encased in a bioplastic in order to reduce damage to an electrical component of the electronic reader, wherein the bioplastic is a plastic material derived from a biomass source comprising one of a vegetable oil, a corn starch, a pea starch, and a microbiota, wherein the bioplastic has a characteristic to absorb humidity;
   storing electronic content in a solid state drive in the electronic reader, wherein a writable storage capacity of the solid state drive is reduced in order to reduce power consumption and heat generation of the solid state drive, wherein a write performance is slower than a read performance, and wherein the electronic content comprises an educational lesson; and
   powering the electronic reader through the battery to provide the electronic content to the user via a display of the electronic reader, wherein the display is either:
      a display comprising organic light emitting diode, wherein said organic light emitting diode is a light emitting diode comprising an emissive electroluminescent layer comprising a film of an organic compound, and wherein the organic light emitting diode is printed onto a substrate with one of an inkjet printer and a screen printing device; or
      a liquid crystal display, wherein said liquid crystal display is a bitstable display, wherein the bitstable display reduces power consumption of the display; and
   illuminating a room via a light source coupled to the electronic reader in order to provide light to the user, wherein the light source is separate from the display.

2. The method of claim 1, wherein the educational lesson comprises a subject, wherein the subject comprises one of a mathematics, a biology, a chemistry, a physics, an economics, a literature, and a history and wherein a medium of the educational lesson comprises one of a text, an image, an audio, and a video, and wherein a language of the educational lesson comprises English.

3. The method of claim 2 further comprising, providing light through the light source, wherein the light source comprises a light emitting diode to generate a white light, wherein the white light is generated comprising one of mixing a red light emitting diode, a green light emitting diode, and a blue light emitting diode and converting one of a blue light emitting diode and an ultraviolet light emitting diode to the white light through a phosphor material.

4. The method of claim 1 further comprising, reducing environmental waste by using a lithium iron phosphate battery, wherein the lithium iron phosphate battery is a rechargeable battery comprising a lithium iron phosphate, wherein the lithium iron phosphate is a cathode.

5. The method of claim 1 further comprising, reducing environmental waste by using a nickel metal hydride battery, wherein the nickel metal hydride battery is a rechargeable battery comprising hydrogen absorbing alloy, wherein the hydrogen absorbing alloy is an anode.

6. The method of claim 1 further comprising, reducing a cost of the electronic content to store on the electronic reader, wherein the electronic content comprises electronic content of a public domain.

7. The method of claim 1, wherein the plastic material has a resistance to water and dust, and wherein the plastic material comprises acrylonitrile butadiene styrene of at least two millimeters thick.

8. The method of claim 1 further comprising,
   preloading a curriculum of a student, wherein the curriculum comprises the educational content comprising educational lesson of a kindergarten study material through a twelfth grade study material, wherein the kindergarten study material through the twelfth grade study material is developed by a nonprofit organization approved by a government organization to provide the curriculum to educate the student, wherein the curriculum conforms to an international standard of an education; and
   storing the curriculum on the storage drive, wherein the storage drive consists only of a read only memory to allow the user of the electronic reader to read the educational lesson.

9. An electronic reader apparatus comprising,
   a photovoltaic cell to convert solar energy into electrical current to utilize the solar energy of the sun, wherein the photovoltaic cell is made into a thin film in order to obtain an efficiency of greater that fourteen percent when converting solar energy into electrical current, said thin film comprises a silicon, wherein the silicon is one of an amorphous silicon, protocrystalline silicon, nanocrystalline silicon, and black silicon, and wherein the thin film of the photovoltaic cell comprises a photosensitive dye to generate a photoelectron to create the electrical current;
   a battery to store the electrical current generated by the photovoltaic cell;
   an electronic content to provide one of a text, an image, an audio, and a video to a user of the electronic reader;
   a solid state drive to store the electronic content of the electronic reader, wherein a writable storage capacity of the solid state drive is reduced in order to reduce power consumption and heat generation of the solid state drive, and wherein a write performance is slower than a read performance;
   a bioplastic casing to encase the electronic reader, wherein the bioplastic is a plastic derived from a biomass source comprising one of a vegetable oil, a corn starch, a pea starch, and a microbiota, wherein the bioplastic has a characteristic to absorb humidity;
   a display to display one of the text, image, and video of the electronic content, wherein the display comprising an organic light emitting diode, wherein the organic light emitting diode is a light emitting diode comprising an emissive electroluminescent layer comprising a film of an organic compound and wherein the organic light emitting diode is printed onto a substrate with one of an inkjet printer and a screen printing device;

a light source coupled to the electronic reader, wherein the light source is utilized to illuminate a room, and wherein the light source is separate from the display;

a hand crank device electromechanically coupled with the electronic reader through a dynamo in order to convert mechanical energy into electrical energy, and to power the electronic reader through the battery to provide the electronic content to the user.

10. The apparatus of claim 9 further comprising, a communication port to enable the electronic reader to transfer the electronic content to an electronic device, wherein the communication port is one of a wireless port and a universal serial bus port.

11. An electronic educational system comprising, a photovoltaic cell to convert solar energy into electrical current to utilize the solar energy of the sun, wherein the photovoltaic cell is made into a thin film, said thin film comprises a silicon, wherein the silicon is one of an amorphous silicon, protocrystalline silicon, nanocrystalline silicon, and black silicon;

a battery to store the electrical current generated by the photovoltaic cell;

an electronic content to provide one of a text, an image, an audio, and a video to a user of the electronic reader;

a solid state drive to store the electronic content of the electronic reader, wherein a writable storage capacity of the solid state drive is reduced in order to reduce power consumption and heat generation of the solid state drive, and wherein a write performance is slower than a read performance;

a display to display one of the text, image, and video of the electronic content, wherein the display comprises an organic light emitting diode, wherein the organic light emitting diode is a light emitting diode comprising an emissive electroluminescent layer comprising a film of an organic compound, and wherein the organic light emitting diode is printed onto a substrate with one of an inkjet printer and a screen printing device;

a plastic material to encase the electronic reader, wherein the plastic material has a resistance to water and dust, and wherein the plastic material comprises acrylonitrile butadiene styrene of at least two millimeters thick;

a hand crank device electromechanically coupled with the electronic reader through a dynamo in order to convert mechanical energy into electrical energy, and to power the electronic reader through the battery to provide the electronic content to the user; and a hub device to transfer electronic content of the hub device to the electronic reader, wherein the hub device is preconfigured to interact with the electronic reader and wherein the electronic reader is preconfigured to interact with the hub device.

12. The system of claim 11 wherein, the hub device distributes the electronic content to the electronic reader, wherein the electronic content comprises an educational lesson and feedback of the educational lesson, and wherein the hub device is accessible to a teacher; and the electronic reader distributes electronic content comprising a homework to the hub device, wherein the electronic reader is accessible to a student.

13. The system of claim 11 further comprising, a communication port to enable the electronic reader to transfer the electronic content to the hub device, wherein the communication port is one of a wireless port and a universal serial bus port.

* * * * *